United States Patent
Sixt et al.

(10) Patent No.: US 11,814,522 B2
(45) Date of Patent: Nov. 14, 2023

(54) ONE-PART ROOM-TEMPERATURE CURABLE COMPOSITIONS ON THE BASIS OF ORGANOSILICON COMPOUNDS AND TITANIUM CURING CATALYSTS

(71) Applicant: WACKER CHEMIE AG, Munich (DE)

(72) Inventors: Torsten Sixt, Mehring (DE); Jian Nie, Shanghai (CN)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 17/558,651

(22) Filed: Dec. 22, 2021

(65) Prior Publication Data

US 2022/0112376 A1 Apr. 14, 2022

Related U.S. Application Data

(63) Continuation of application No. 16/346,377, filed as application No. PCT/CN2016/104014 on Oct. 31, 2016, now abandoned.

(51) Int. Cl.
| | |
|---|---|
| *C08L 83/06* | (2006.01) |
| *C08G 77/16* | (2006.01) |
| *C08K 3/36* | (2006.01) |
| *C08K 5/00* | (2006.01) |
| *C08K 5/5419* | (2006.01) |
| *C08K 5/56* | (2006.01) |

(52) U.S. Cl.
CPC ............. *C08L 83/06* (2013.01); *C08G 77/16* (2013.01); *C08K 3/36* (2013.01); *C08K 5/0025* (2013.01); *C08K 5/5419* (2013.01); *C08K 5/56* (2013.01); *C08L 2312/00* (2013.01)

(58) Field of Classification Search
CPC ...................................................... C08L 83/06
See application file for complete search history.

(56) References Cited

U.S. PATENT DOCUMENTS

| | | |
|---|---|---|
| 3,240,731 A | 3/1966 | Nitzsche et al. |
| 3,474,064 A | 10/1969 | Paul et al. |
| 4,410,677 A | 10/1983 | Lampe |
| 4,525,565 A | 6/1985 | Laisney et al. |
| 4,672,004 A | 6/1987 | Chizat |
| 5,939,575 A | 8/1999 | Horn et al. |
| 6,218,495 B1 | 4/2001 | Braun et al. |
| 6,342,575 B1 | 1/2002 | Miyake |
| 9,428,634 B2 * | 8/2016 | Jadot .................... C09D 183/06 |
| 2007/0237912 A1 | 10/2007 | Correia |
| 2007/0282060 A1 * | 12/2007 | Scholey .................. C08L 83/04 |
| | | 524/588 |
| 2011/0116280 A1 | 5/2011 | Lee |

FOREIGN PATENT DOCUMENTS

| | | |
|---|---|---|
| CN | 101531775 A | 9/2009 |
| CN | 101629063 A | 1/2010 |
| CN | 102850807 A | 1/2013 |
| CN | 103788914 A | 5/2014 |
| CN | 105238340 A | 1/2016 |
| CN | 105295828 A | 2/2016 |
| DE | 19649028 A1 | 5/1998 |
| EP | 0940445 A1 | 9/1999 |

OTHER PUBLICATIONS

English langauge translation CN 105295828 (Feb. 2016).*
Journal of Adhesion Science and Technology, 2003, vol. 17, No. 2, p. 261-275.

* cited by examiner

*Primary Examiner* — Margaret G Moore
(74) *Attorney, Agent, or Firm* — BROOKS KUSHMAN P.C.

(57) ABSTRACT

One-part room-temperature curable compositions (RTV-1 compositions) based on organosilicon compounds are less toxic compared to conventional compositions containing organotin compounds and, at the same time, have excellent curing properties, a skin formation time which allows proper handling and tooling, and excellent storage stability. The compositions contain: at least one organosilicon compound containing condensable groups; at least one curing agent having the formula $R'Si(OOCR'')_3$, wherein R' is $C_3$-$C_6$ alkyl, and R" is $C_1$-$C_6$ alkyl; at least one organotitanium compound curing catalyst; and at least one filler.

22 Claims, No Drawings

ONE-PART ROOM-TEMPERATURE CURABLE COMPOSITIONS ON THE BASIS OF ORGANOSILICON COMPOUNDS AND TITANIUM CURING CATALYSTS

CROSS REFERENCE TO RELATED APPLICATION

This application is a continuation of U.S. Ser. No. 16/346,377 filed Apr. 30, 2019, now abandoned which is the U.S. National Phase of PCT Appln. No. PCT/CN2016/104014 filed Oct. 31, 2016, the disclosures of which are incorporated in their entirety by reference herein.

BACKGROUND OF THE INVENTION

1. Field of the Invention

The present invention relates to one-part room-temperature curable compositions (RTV-1 compositions) based on organosilicon compounds and titanium catalysts having excellent curing properties, skin formation time and storage stability.

2. Description of the Related Art

Silicone sealants have become vital components in building and assembly in today's demanding world. More importantly, they have become indispensable products in essentially all key industries.

Curing of RTV-1 compositions based on organosilicon compounds is initiated at room temperature when they are exposed to atmospheric humidity. This allows for the production of ready-to-use silicone compositions which do not require additional preparation steps such as mixing of two or more components prior to use or additional steps and equipment for inducing curing such as heating or radiation. This makes RTV-1 compositions based on organosilicon compounds especially easy, economical and time-saving to use in a variety of applications such as, for example, in building construction, windows and glazing applications, sanitary applications, fittings, roofing, DIY applications, etc.

Known RTV-1 compositions typically contain a curable silicone polymer, a curing agent and a curing catalyst. The most commonly used curing catalysts comprise organotin compounds. However, from a toxicological perspective organotin compounds are highly problematic. This is a particular concern if the RTV-1 compositions are to be used in pharmaceutical, prosthetics or food related applications. Accordingly, it has been a longstanding goal to find healthier alternatives. Regulatory restrictions may further limit the scope of potential alternative curing catalysts.

Although titanium catalysts have in general been known for neutral RTV-1 systems (neutral systems comprise a curing agent containing organyloxy group(s) e.g. methoxy or ethoxy), they have not broadly found entry into acidic systems (acidic systems comprise a curing agent containing acyloxy group(s) e.g. acetoxy). Major drawbacks of acidic RTV-1 compositions using titanium catalysts are inferior curing properties, in particular too short skin formation time, inferior storage stability, and discoloration.

U.S. Pat. No. 4,410,677 A discloses silicone compositions containing carboxylates of zinc or zirconium as curing catalysts. However, an alkyl tin carboxylate has to be added in order to ensure good storage stability. In particular, compositions without the alkyl tin carboxylate had only poor storage stability, i.e. their curing properties were not stable under accelerated ageing.

U.S. Pat. No. 4,525,565 A discloses organopolysiloxane compositions containing specific organic titanium or zirconium derivatives as curing catalysts. However, the reported catalysts are either of limited commercial availability or they show very short skin formation times of under 10 minutes. Moreover, titanium chelate derivatives lead to undesired discoloration of white or transparent compositions.

Technical Problem

Taking account of the technical drawbacks described above, it has been an object to provide a one-part room-temperature curable composition on the basis of organosilicon compounds which is less toxic compared to conventional compositions that contain organotin compounds and, at the same time, has excellent curing properties, a skin formation time which allows proper handling and tooling, and storage stability. Preferably, the composition does not show any discoloration or crystallization.

SUMMARY OF THE INVENTION

These problems have been solved by the claimed subject-matter, namely, by using a curing catalyst comprising an organotitanium compound in combination with a curing agent comprising a compound of formula (IV)

$$R'Si(OOCR'')_3 \qquad (IV)$$

wherein R' is $C_3$-$C_6$ alkyl, and R'' is the same or different and independently selected from $C_1$-$C_6$ alkyl. This combination surprisingly leads to a superior skin formation time, curing properties and storage stability.

DETAILED DESCRIPTION OF THE PREFERRED EMBODIMENTS

For the purposes of the present invention, the expression "one-part" is intended to mean that the components of the silicone composition are stored together as a pre-made mixture in a single package.

For the purposes of the present invention, the expression "curing agent" is intended to mean a compound or combination of compounds that comprise reactive groups that are capable of reacting with functional groups of the organosilicon compound. The curing agent is thereby incorporated into the structure of the resultant (cured) silicone elastomer.

For the purposes of the present invention, the expression "curing catalyst" is intended to mean a compound or combination of compounds that is capable of catalyzing the condensation reaction of organosilicon compound and curing agent in the presence of moisture or water.

For the purposes of the present invention, the expression "RTV" means room-temperature vulcanizable or, synonymously, room-temperature curable.

For the purposes of the present invention, unless otherwise specified the expression "room temperature" is intended to mean a temperature of 23±2° C.

For the purposes of the present invention, the expression "condensable radicals" or "condensable groups" is also intended to mean those radicals or groups which concomitantly include any preceding hydrolysis step.

For the purposes of the present invention, the expression "condensation reaction" is also intended to encompass concomitantly any preceding hydrolysis step.

For the purposes of the present invention, the expression "skin formation time" defines the period of time until a thin elastic film has been built on the surface of the composition, differing from the material beneath it. Once the skin formation time has been exceeded adhesion of the composition to substrates is significantly worsened. Accordingly, the skin formation time is an indicator for the maximum time in which the composition must be applied to the substrates. For example, if the skin formation time is too low, applications in warm and humid environments become problematic or even impossible as curing is induced too quickly. A skin formation time which allows proper handling and tooling for construction sealants therefore is considered to be suitable when it exceeds a minimum of 10 minutes, ideally in the range of 15 to 30 minutes.

The expressions "substituted" or "having one or more substituents" as used herein means that one or more hydrogen atoms of a chemical compound or chemical group are replaced with an atom or group of atoms other than hydrogen. Unless otherwise indicated, the substituent is preferably selected from halogenide (such as, for example, fluoride, chloride, bromide, and iodide), alkyl (such as, for example, methyl, ethyl, n-propyl, iso-propyl, n-butyl, sec-butyl, iso-butyl, tert-butyl, n-amyl, or tert-amyl), hydroxyl, alkoxy (such as, for example, methoxy, or ethoxy), aryl (such as, for example, phenyl, tolyl, xylyl, 1-, or 2-naphthyl, 1-, 2-, 3-, 4-, or 9-phenanthryl, 1-, 2-, or 9-anthracyl), alkenyl (such as, for example, vinyl, allyl, or 1-butenyl), benzoyl, acetyl, formyl, nitro, (primary, secondary or tertiary) amino, cyano, mercapto, carboxyl, carboxylate (such as, for example, methyl carboxylate, or ethyl carboxylate), carbamoyl, N,N-alkylcarbamoyl, sulfonyl and sufinyl.

For the purposes of the present invention, the term "comprising" also includes the more limited alternative "consisting of" the subsequently-described components, which means that no further components or constituents may be present.

The present invention relates to a one-part room-temperature curable composition comprising:
(A) at least one organosilicon compound containing condensable groups;
(B) at least one curing agent comprising a compound having the following formula (IV):

$$R'Si(OOCR'')_3 \quad (IV)$$

wherein
R' is $C_3$-$C_6$ alkyl, and
R'' is the same or different and independently selected from $C_1$-$C_6$ alkyl; and
(C) at least one curing catalyst comprising an organotitanium compound; and
(D) at least one filler.

Component (A)

The organosilicon compound of component (A) may be any organosilicon compound known in the art that is suitable to undergo condensation curing (cross-linking via condensation reaction).

Preferably, the organosilicon compound of component (A) contains two or more condensable groups per molecule of the organosilicon compound, wherein the condensable groups are selected from hydroxyl groups, acyloxy groups or combinations thereof.

Preferably, the organosilicon compound is a polymer or copolymer comprising siloxane units, i.e. ≡S—O—Si≡ structures, silcarbane units, i.e. ≡Si—$R^x$—Si≡ structures, or combinations thereof, wherein $R^x$ is a divalent hydrocarbon radical which may be substituted or unsubstituted, and wherein one or more carbon atoms of the hydrocarbon radical may optionally be replaced with heteroatoms selected from the group consisting of O, S and N. More preferably, the organosilicon compound is an organopolysiloxane, i.e. a polymer consisting of siloxane units.

In one embodiment, the organosilicon compound comprises units of formula (I):

$$R_aY_bSiO_{(4-a-b)/2} \quad (I),$$

wherein
R can be identical or different and is a substituted or unsubstituted hydrocarbon radical, wherein one or more carbon atoms of the hydrocarbon radical may optionally be replaced with oxygen atoms,
Y can be identical or different and is a hydroxy radical or acyloxy radical,
a is 0, 1, 2, or 3, preferably 1 or 2, and
b is 0, 1, 2, or 3, preferably 0, 1, or 2, particularly preferably 0,
with the proviso that the sum of a and b is less than or equal to 3 and at least two Y radicals are present per molecule of the organosilicon compound.

The sum of a and b in formula (I) is preferably 2 or 3.

Preferably, R is a monovalent hydrocarbon radical having from 1 to 18 carbon atoms, wherein the hydrocarbon radical is optionally substituted with one or more substituents. Preferably, the substituents are selected from the group consisting of halogen atoms, amino groups, ether groups, ester groups, epoxy groups, mercapto groups, cyano groups, and (poly)glycol radicals, the latter being composed of oxyethylene units and/or oxypropylene units. More preferably, R is an alkyl radical having from 1 to 12 carbon atoms. Even more preferably, R is a methyl radical.

The radical R may also be a divalent radical which, for example, bonds two silyl groups to one another.

Examples of radicals R are alkyl radicals such as methyl, ethyl, n-propyl, isopropyl, 1-n-butyl, 2-n-butyl-, isobutyl, tert-butyl, n-pentyl, isopentyl, neopentyl, and tert-pentyl; hexyl radicals such as n-hexyl; heptyl radicals such as n-heptyl; octyl radicals such as n-octyl, iso-octyl, 2,2,4-trimethylpentyl; nonyl radicals such as n-nonyl; decyl radicals such as n-decyl; dodecyl radicals, such as n-dodecyl; octadecyl radicals such as n-octadecyl; cycloalkyl radicals such as cyclopentyl, cyclohexyl, cycloheptyl and methylcyclohexyl; alkenyl radicals such as vinyl, 1-propenyl, and 2-propenyl; aryl radicals such as phenyl, naphthyl, anthryl, and phenanthryl; alkaryl radicals such as o-, m-, p-tolyl, xylyl and ethylphenyl; and aralkyl radicals such as the benzyl and α- and β-phenylethyl.

Examples of substituted radicals R are methoxyethyl, ethoxyethyl, and ethoxyethoxyethyl.

Examples of divalent radicals R are polyisobutylenediyl radicals and propanediyl-terminated polypropylene glycol radicals.

Preferably, Y is a an acetoxy radical.

In a further embodiment, the organosilicon compound is an organopolysiloxane of formula (II):

$$Y_{3-f}R_fSiO—(SiR_2O)_e—SiR_fY_{3-f} \quad (II),$$

wherein
each of R and Y can be identical or different and are the same as defined above for formula (I),
e is from 30 to 3000, and
f is 1 or 2.
f is preferably 2 if Y is hydroxy, and f is preferably 1 or 0 if Y is acyloxy.

Preferably, the organosilicon compound is selected from the group consisting of (AcO)$_2$MeSiO[SiMe$_2$O]$_{200-2000}$SiMe(OAc)$_2$,
(HO)Me$_2$SiO[SiMe$_2$O]$_{200-2000}$SiMe$_2$(OH),
(AcO)$_2$ViSiO[SiMe$_2$O]$_{200-2000}$SiVi(OAc)$_2$,
(AcO)$_2$ViSiO[SiMe$_2$O]$_{200-2000}$SiPr(OAc)$_2$,
(AcO)$_2$EtSiO[SiMe$_2$O]$_{200-2000}$SiEt(OAc)$_2$,
(AcO)$_2$PrSiO[SiMe$_2$O]$_{200-2000}$SiPr(OAc)$_2$,
(AcO)$_2$MeSiO[SiMe$_2$O]$_{200-2000}$SiPr(OAc)$_2$,
(AcO)$_2$PrSiO[SiMe$_2$O]$_{200-2000}$SiEt(OAc)$_2$, and combinations thereof,
wherein Me is a methyl radical, Et is an ethyl radical, Pr is a n-propyl radical, Vi is a vinyl radical, and Ac is an acetoxy radical.

The viscosity of the organosilicon compound is preferably from 100 to 1,000,000 mPa·s, more preferably from 1,000 to 350,000 mPa·s, measured at a temperature of 25° C. The viscosity can be determined according to DIN 53019-1 using a plate-cone rheometer having a cone with a diameter of 50 mm, an angle of 2° at a temperature of 25° C. and a shear rate sweep from 1 1/s to 10 1/s by linear regression.

The organosilicon compounds in accordance with the present invention are commercially available products or can be prepared by methods known in the art.

Preferably, the composition of the present invention contains component (A) in an amount of 30 wt.-% or more to 90 wt.-% or less, more preferably 40 wt.-% or more to 85 wt.-% or less based on the total weight of the composition.

Component (B)

According to the present invention, the composition further comprises (B) at least one curing agent comprising a compound having the following formula (IV):

$$R'Si(OOCR'')_3 \quad \text{(IV)}$$

wherein
R' is C$_3$-C$_6$ alkyl, preferably C$_3$-C$_5$ alkyl, more preferably C$_3$ alkyl, for example n-propyl, and
R'' is the same or different and independently selected from C$_1$-C$_6$ alkyl, preferably C$_1$-C$_4$ alkyl, more preferably methyl or ethyl.

Examples of the compound of formula (IV) are n-propyltriacetoxysilane, n-butyltriacetoxysilane, n-pentyltriacetoxysilane, n-hexyltriacetoxysilan. Particularly preferred is n-propyltriacetoxysilane.

Optionally, the curing agent (B) further comprises condensates of two or more molecules of the compound of formula (IV), i.e. siloxane oligomers obtainable through condensation of two or more molecules of the compound of formula (IV). The condensates may be homo-condensates, i.e. condensates of only one type of silane, or co-condensates, i.e. condensates of at least two types of silanes. Up to 30% of all Si atoms of the curing agent may be contained in condensates. The use of condensates may further inhibit crystallization during storage.

Optionally, the curing agent further comprises one or more additional curing agents other than the compound of formula (IV) or condensates thereof. The additional curing agent may be any curing agent known in the art that is suitable to react with component (A) via condensation reaction. Preferably, the additional curing agent has at least three condensable radicals, such as, for example, silanes or siloxanes having at least three organyloxy groups.

In one embodiment, the additional curing agent is a compound of the formula (III)

$$Z_cSiR^1_{(4-c)} \quad \text{(III)},$$

wherein
R' can be identical or different and is a monovalent, unsubstituted or substituted hydrocarbon radical, wherein one or more carbon atoms of the hydrocarbon radical may optionally be replaced with oxygen atoms,
Z can be identical or different and is a condensable radical, such as, for example, a hydrocarbon radical which is unsubstituted or substituted and which is bonded to the Si atom by way of an oxygen atom or nitrogen atom, and
c is 2, 3 or 4, preferably 3 or 4.

Preferably, Z is a OR$^2$ radical, wherein R$^2$ is an unsubstituted or substituted hydrocarbon radical, wherein one or more carbon atoms of the hydrocarbon radical may optionally be replaced with heteroatoms such as oxygen, nitrogen or sulfur.

Examples of Z are alkoxy radicals, such as methoxy, ethoxy, n-propoxy, isopropoxy, n-butoxy, isobutoxy, sec-butoxy, tert-butoxy, and 2-methoxyethoxy; acyloxy radicals, such as acetoxy; and enoxy radicals, such as 2-propenoxy. More preferably, Z is acetoxy.

In another embodiment, the additional curing agent is a condensate of two or more molecules of the compounds of the formula (III). The condensates may be homo-condensates, i.e. condensates of one type of compounds of the formula (III), or co-condensates, i.e. condensates of at least two different types of compounds of the formula (III). In a preferred embodiment, the condensates contain 2 to 10 silicon atoms, i.e. condensates obtainable through condensation of 2 to 10 molecules of one or more compounds of formula (III). More preferably, the condensates are obtainable through condensation of 4 to 8, even more preferably, 6 molecules.

Due to their preparation process, compounds of formula (III) may contain a small proportion of Si-bonded hydroxy groups. Preferably, at most 5 wt.-%, more preferably at most 1 wt.-%, of all Si-bonded radicals of formula (III) compounds are hydroxyl groups.

Examples of radical R$^1$ are the monovalent examples mentioned above for radical R. Preferably, R$^1$ is a hydrocarbon radical having from 1 to 12 carbon atoms. More preferably, R$^1$ is selected from ethyl, methyl and vinyl.

Preferably, the additional curing agents are selected from the group consisting of methyltriacetoxysilane, ethyltriacetoxysilane, vinyltriacetoxysilane, dimethyl-diacetoxysilane, methylvinyldiacetoxysilane, dimethoxydiacetoxysilane, diethoxydiacetoxysilane, dipropoxydiacetoxysilane, dibutoxydiacetoxysilane, di-tert-butoxydiacetoxysilane and partial homo- or co-condensates thereof. Particularly preferred is methyltriacetoxysilane.

The curing agents in accordance with the present invention are commercially available products or can be prepared by processes known in the art. For example, methods for the production of carbonoyloxy silanes are reported in DE 196 49 028 A1.

Preferably, the composition of the present invention comprises component (B) in an amount of from 0.01 to 20 parts by weight, more preferably from 2 to 15 parts by weight, even more preferably from 4 to 10 parts by weight, based on 100 parts by weight of component (A).

Preferably, the composition of the present invention contains component (B) in an amount of 1 wt.-% or more to 10 wt.-% or less, more preferably 2.5 wt.-% or more to 6 wt.-% or less based on the total weight of the composition.

For the sake of clarity, component (B) is different from component (A).

Component (C)

According to the present invention, the composition further comprises (C) at least one curing catalyst comprising an organotitanium compound.

Preferably, the organotitanium compound has the following formula (V):

wherein R''' is the same or different and is independently selected from $C_1$-$C_{10}$ alkyl, more preferably $C_1$-$C_5$ alkyl, even more preferably n-butyl.

Preferably, the curing catalyst is selected from the group consisting of tetra-n-butyl titanate, tetra-n-propyl titanate, tetra-isopropyl titanate, tetra-ethyl titanate, tetra-isobutyl titanate, tetra-tert-butyl titanate, tetramethyl titanate, tetra-n-pentyl titanate, tetra-isopentyl titanate and combinations of one or more of the foregoing organotitanium compounds.

Preferably, the composition of the present invention does not comprise an organotin compound.

Preferably, the composition of the present invention comprises component (C) in an amount of from 0.001 to 2 parts by weight, more preferably from 0.001 to 0.5 parts by weight, based on 100 parts by weight of component (A).

Preferably, the composition of the present invention contains component (C) in an amount of 0.001 wt.-% or more to 0.1 wt.-% or less based on the total weight of the composition.

Surprisingly, it has been found that a combination of organotitanium compounds (C) with curing agents (B) as described above leads to compositions that have excellent curing properties, suitable skin formation time, i.e. exceeding 10 min, and excellent storage stability. Furthermore the compositions do not show crystallization during storage or handling of the composition and do not show any discoloration.

Component (D) According to the present invention, the composition further comprises (D) at least one filler.

Examples of fillers (D) are non-reinforcing fillers with resistance to organic acids, i.e. fillers having a BET surface area of 50 $m^2$/g or less, e.g. quartz, diatomaceous earth, coated calcium silicate, zirconium silicate, zeolites, metal oxide powders, such as aluminum oxides, titanium oxides, iron oxides, or zinc oxides, or mixed oxides of these, barium sulfate, gypsum, anhydrite, talcum, silicon nitride, silicon carbide, boron nitride, glass powder, and plastics powder, such as polyacrylonitrile powder; reinforcing fillers, i.e. fillers having a BET surface area of more than 50 $m^2$/g, such as fumed silica, precipitated silica, carbon black, such as furnace black and acetylene black, and silicon-aluminum mixed oxides having a high BET surface area; fibrous fillers, such as glass and also dendritic fibers. The fillers mentioned may have optionally been hydrophobicized, for example by treatment with organosilanes, with organosiloxanes or with stearic acid, or by etherification of the hydroxy groups to give alkoxy groups. Preferably, the filler is selected from the group consisting of hydrophilic fumed silica, quartz, anhydrite, talcum and combinations thereof.

In a preferred embodiment, the filler (D) comprises fumed silica.

Preferably, the composition of the present invention comprises filler(s) (D) in an amount of from 0 to 300 parts by weight, more preferably from 1 to 200 parts by weight, even more preferably from 5 to 150 parts by weight, based in each case on 100 parts by weight of organosilicon compound (A).

Preferably, the composition of the present invention contains component (D) in an amount of 0 wt.-% or more to 60 wt.-% or less, more preferably 5 wt.-% or more to 50 wt.-% or less based on the total weight of the composition.

For the sake of clarity, component (D) is different from components (A), (B), (C), (E), (F) and (G).

Additional Components

In addition to the components (A), (B), (C) and (D) described above, the composition of the present invention may optionally further comprise one or more components selected from the group consisting of (E) at least one plasticizer,
(F) at least one coupling agent, and
(G) at least one further additive.

Examples of plasticizers (E) are dimethylpolysiloxanes which are liquid at room temperature and which have been end-capped by trimethylsiloxy groups, preferably those having a viscosity at 25° C. in the range from 50 to 1,000 mPas, organopolysiloxanes which are liquid at room temperature and which consist essentially of —$SiO_{3/2}$ units and =$SiO_{1/2}$ units, known as T and M units, and high-boiling-point hydrocarbons, e.g. paraffin oils or mineral oils which consist essentially of naphthenic and paraffinic units. Preferably, the hydrocarbon based plasticizers have a kinematic viscosity between 3 and 8 $mm^2$/s at 40° C. and an initial boiling point of 220° C. to 300° C.

Preferably, the composition of the present invention comprises plasticizer(s) (E) in an amount of from 0 to 300 parts by weight, more preferably from 10 to 200 parts by weight, even more preferably from 20 to 100 parts by weight, based on 100 parts by weight of component (A).

Preferably, the composition of the present invention contains component (D) in an amount of 0 wt.-% or more to 50 wt.-% or less, more preferably 10 wt.-% or more to 40 wt.-% or less based on the total weight of the composition.

For the sake of clarity, component (E) is different from components (A), (B), (C), (D), (F) and (G).

Examples of the coupling agents (F) used in the inventive compositions are silanes and organopolysiloxanes having functional groups which are capable of undergoing further cross-linking reactions, for example, those having glycidoxypropyl, isocyanurato or methacryloxypropyl radicals.

Preferably, the composition of the present invention comprises coupling agent(s) (F) in an amount of from 0 to 50 parts by weight, more preferably from 0.5 to 20 parts by weight, even more preferably from 0.5 to 5 parts by weight, based in each case on 100 parts by weight of organosilicon compound (A).

Preferably, the composition of the present invention contains component (F) in an amount of 0 wt.-% or more to 3 wt.-% or less, more preferably 0.1 wt.-% or more to 1.5 wt.-% or less based on the total weight of the composition.

For the sake of clarity, component (F) is different from components (A), (B), (C), (D), (E) and (G).

Examples of additives (G) are pigments, dyes, odorants, oxidation inhibitors, agents for influencing electrical properties, e.g. conductive carbon black, flame-retardant agents, light stabilizers, fungicides, agents for prolonging skin formation time, such as silanes having an SiC-bonded mercaptoalkyl radical, cell-generating agents, e.g. azodicarbonamide, heat stabilizers, scavengers, such as silylamides or silazanes containing Si—N, co-catalysts, such as Lewis acids and Brönsted acids, e.g. sulfonic acids, phosphoric acids, phosphoric esters, phosphonic acids and phosphonic esters, viscosity modifiers, e.g. phosphoric esters, polyalkyleneglycols, oligo- or polyalkyleneglycol modified organic oils, organic solvents, such as alkyl aromatics, organopolysiloxanes other than those of component (A), adhesion promoters, and diluents.

Preferably, the composition of the present invention comprises additive(s) (G) in an amount of from 0 to 100 parts by weight, more preferably from 0.01 to 30 parts by weight, even more preferably from 0.3 to 10 parts by weight, based in each case on 100 parts by weight of organosilicon compound (A).

Preferably, the composition of the present invention contains component (G) in an amount of 0 wt.-% or more to 5 wt.-% or less, more preferably 0.025 et.-% or more to 2.0 wt.-% or less based on the total weight of the composition.

For the sake of clarity, component (G) is different from components (A), (B), (C), (D), (E), and (F).

In one embodiment, the composition of the present invention comprises a one-part room-temperature curable composition comprising:
- (A) at least one organosilicon compound containing condensable groups;
- (B) at least one curing agent comprising a compound of formula (IV) as defined above;
- (C) at least one curing catalyst comprising an organotitanium compound;
- (D) at least one filler
optionally
- (E) at least one plasticizer;
optionally
- (F) at least one coupling agent; and
optionally
- (G) at least one further additive.

In a further embodiment, the composition of the present invention comprises,
- (A) at least one organosilicon compound containing at least two condensable groups selected from hydroxyl group, acetoxy group or a combination thereof;
- (B) at least one curing agent comprising a compound of formula (IV) as defined above and condensates of two or more molecules of the compound of formula (IV) as defined above; and
- (C) at least one curing catalyst selected from the group consisting of, combinations of one or more of the foregoing organotitanium compounds.

In a further embodiment, the composition of the present invention comprises
- (A) at least one organosilicon compound selected from the group consisting of
  (AcO)$_2$MeSiO[SiMe$_2$O]$_{200-2000}$SiMe(OAc)$_2$,
  (HO)Me$_2$SiO[SiMe$_2$O]$_{200-2000}$SiMe$_2$(OH),
  (AcO)$_2$ViSiO[SiMe$_2$O]$_{200-2000}$SiVi(OAc)$_2$,
  (AcO)$_2$EtSiO[SiMe$_2$O]$_{200-2000}$SiEt(OAc)$_2$,
  (AcO)$_2$PrSiO[SiMe$_2$O]$_{200-2000}$SiPr(OAc)$_2$,
  (AcO)$_2$MeSiO[SiMe$_2$O]$_{200-2000}$SiPr(OAc)$_2$,
  (AcO)$_2$PrSiO[SiMe$_2$O]$_{200-2000}$SiEt(OAc)$_2$,
  (AcO)$_2$PrSiO[SiMe$_2$O]$_{20-2000}$SiVi(OAc)$_2$,
  and combinations thereof,
wherein Me is a methyl radical, Et is an ethyl radical, Pr is a n-propyl radical, Vi is a vinyl radical, and Ac is an acetoxy radical;
- (B) at least one curing agent comprising a compound of formula (IV) as defined above; and
- (C) at least one curing catalyst selected from the group consisting of, and combinations of one or more of the foregoing organotin compounds.

In a further embodiment the composition of the present invention comprises, preferably consists of,
- (A) at least one polyorganosiloxane of the following formula (II):

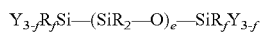  (II), wherein
R can be identical or different and is a substituted or unsubstituted hydrocarbon radical, wherein one or more carbon atoms of the hydrocarbon radical may optionally be replaced with oxygen atoms,
Y can be identical or different and is a hydroxy radical or acyloxy radical,
e is from 30 to 3000, and
f is 1 or 2;
- (B) at least one curing agent comprising a compound of formula (IV) as defined above;
- (C) at least one curing catalyst selected from the group consisting of, and combinations of one or more of the foregoing organotin compounds;
- (D) at least one filler selected from the group consisting of hydrophilic fumed silica, quartz, anhydrite, talcum and combinations thereof; and one or more components selected from the group consisting of
- (E) at least one plasticizer selected from the group consisting of trimethylsiloxy-terminated dimethylpolysiloxanes, organopolysiloxanes which consist essentially of —SiO$_{3/2}$ units and =SiO$_{1/2}$ units, and paraffin oils or mineral oils consisting essentially of naphthenic and paraffinic units;
- (F) at least one coupling agent selected from the group consisting of silanes containing glycidoxypropyl, or methacryloxypropyl radicals; and
- (G) at least one further additive selected from the group consisting of pigments, dyes, odorants, oxidation inhibitors, agents for influencing electrical properties, flame-retardant agents, light stabilizers, fungicides, agents for prolonging skin formation time, cell-generating agents, heat stabilizers, scavengers, Lewis acids, Brönsted acids, viscosity modifiers, organic solvents, organopolysiloxanes other than those of component (A), adhesion promoters, and diluents.

The compositions of the present invention are preferably viscous to pasty compositions. Preferably, the viscosity of the compositions is 100,000 m·Pas or higher, measured under the conditions mentioned above at a shear rate of 0.1 l/s.

A viscous to pasty consistency is advantageous for the easy handling of the compositions when they are applied to the desired substrate. More preferably, the shear force at the flow point, defined as tan δ=1 with tan δ=G"/G', is 500 Pa or more. Even more preferably, both the viscosity at the shear rate of 0.1 l/s and the shear force at the flow point has a value of 500 Pa or more.

The compositions of the present invention can be prepared by conventional methods known in the art. In particular, all of the components can be mixed with one another in any desired sequence. This mixing can be carried out under standard conditions, i.e. at room temperature and at the pressure of the ambient atmosphere, i.e. from about 900 to 1,100 hPa. If desired, mixing may also be carried out at higher temperatures, e.g. at temperatures in the range from 35° C. to 135° C. If desired, mixing may also be partially or entirely carried out under reduced pressure, e.g. at an absolute pressure of from 30 to 500 hPa, in order to remove volatile compounds or air.

Usually, the normal water content of ambient air is sufficient for cross-linking the compositions of the present invention. If desired, cross-linking may also be carried out in air having an increased humidity level. Preferably, cross-linking is carried out in an atmosphere having a water content of 1 g/m³ to 80 g/m³ air, more preferably 2 g/m³ to 40 g/m³ air, even more preferably 5 g/m³ to 25 g/m³ air.

Preferably, cross-linking takes place at room temperature. If desired, it may also be carried out at temperatures higher or lower than room temperature, e.g. at from −5° C. to 15° C. or from 30° C. to 50° C.

The curing of the composition is preferably carried out at a pressure of from 100 to 1,100 hPa, in particular at the pressure of the ambient atmosphere, i.e. from 900 to 1,100 hPa.

The present invention also provides moldings produced via cross-linking of the compositions of the present invention. Such moldings can be produced by any method known in the art.

The inventive compositions can be used for any intended purpose for which it is possible to use compositions which can be stored in the absence of water and which crosslink to give elastomers at room temperature in the presence of water.

The composition of the present invention is particularly suitable for applications such as sealing of joints and cavities, in particular vertically running joints and/or cavities having a gap width of from 10 to 40 mm. Such joints and cavities may be present in buildings, land vehicles, watercrafts, or aircrafts. The composition of the present invention can further be used as an adhesive or putty composition, for example, in window construction or in the production of display cabinets. Moreover, the composition of the present invention can further be used for the production of protective coatings, in particular coatings for surfaces having continuous exposure to fresh or salt water, or anti-slip coatings. Furthermore, the composition of the present invention can further be used for the production of elastomeric moldings, for example, for insulation of electrical or electronic devices. As the compositions of the present invention are less toxic than conventional compositions, they can be used in pharmaceutical, prosthetics or food related applications.

Advantageously, the compositions of the present invention have improved storage stability while having excellent skin formation time, viscosity and other physical properties. In particular, the compositions of the present invention can be used even in warm and humid climatic conditions. Furthermore, they have excellent handling properties in a wide variety of applications.

EXAMPLES

In the examples described below, all viscosities are measured at a temperature of 25° C. unless otherwise stated. Unless otherwise stated, the examples below are carried out at the pressure of the ambient atmosphere, i.e. at 900 to 1,100 hPa, and at room temperature, i.e. at about 23° C., or at the temperature which is developed when the reactants are combined at room temperature without additional heating or cooling, and at about 50% relative humidity. All of the parts and percentages data are moreover based on weight unless otherwise stated.

The rheology of the curable compositions is determined according to DIN 54458 using an amplitude sweep with plate-plate array. The plate has a diameter of 25 mm, is used with a gap width of 0.5 mm and a frequency of 10 Hz at 25° C. Viscosity $\eta^*(\gamma=100\%)$ refers is the complex viscosity [mPa·s] at a deformation of 100% according to DIN 54458. The flow point refers to the critical shear stress value above at which a sample rheologically behaves like a liquid The flow point is defined herein as shear stress [Pa] at tan δ=1 with tan δ=G″/G′. G′ corresponds to the storage modulus, G″ corresponds to the loss modulus.

Shore A hardness was measured in accordance with DIN 53505

Comparative Example 1

200 g of α,ω-dihydroxypolydimethylsiloxane having a viscosity of 80,000 mPa·s, 100 g of a trimethylsilyl-terminated polydimethylsiloxane having a viscosity of 1,000 mPa·s, and 15.8 g of methyltriacetoxysilane (melted before use) were mixed for 5 minutes in a planetary mixer. Subsequently, 26 g of fumed silica having a specific surface area of 150 m²/g (commercially available under the trademark HDK® V15 from Wacker Chemie AG, Germany) was incorporated into the mixture. After 20 minutes of homogenization in vacuo, 0.25 g di-n-butyltin diacetate was admixed under vacuum. The resulting composition was then filled into a moisture-proof container for further storage.

Comparative Example 2

200 g of a α,ω-dihydroxypolydimethylsiloxane having a viscosity of 80,000 mPa·s, 100 g of a trimethylsilyl-terminated polydimethylsiloxane having a viscosity of 1,000 mPa·s, and 15.8 g of methyltriacetoxysilane (melted before use) were mixed for 5 minutes in a planetary mixer. Subsequently, 26 g of fumed silica having a specific surface area of 150 m²/g (commercially available under the trademark HDK® V15 from Wacker Chemie AG, Germany) was incorporated into the mixture. After 20 minutes of homogenization in vacuo, 0.01 g tetra-n-butyl titanate monomer was admixed under vacuum. The resulting composition was then filled into a moisture-proof container for further storage.

Comparative Example 3

200 g of a α,ω-dihydroxypolydimethylsiloxane having a viscosity of 80,000 mPa·s, 100 g of a trimethylsilyl-terminated polydimethylsiloxane having a viscosity of 1,000 mPa·s and 15.8 g of a partially oligomeric methyltriacetoxysilane (76 mol % monomers, 23 mol % dimers and 1 mol % higher oligomers) were mixed for 5 minutes in a planetary mixer. Subsequently, 26 g of fumed silica having a specific surface area of 150 m²/g (commercially available under the trademark HDK® V15 from Wacker Chemie AG, Germany) was incorporated into the mixture. After 20 minutes of homogenization in vacuo, 0.01 g tetra-n-butyl titanate monomer was admixed under vacuum. The resulting composition was then filled into a moisture-proof container for further storage.

Comparative Example 4

200 g of a α,ω-dihydroxypolydimethylsiloxane having a viscosity of 80,000 mPa·s, 100 g of a trimethylsilyl-terminated polydimethylsiloxane having a viscosity of 1,000 mPa·s and a liquid preblend of 10 g of ethyltriacetoxysilane and 5.8 g of methyltriacetoxysilane were mixed for 5 minutes in a planetary mixer. Subsequently, 26 g of fumed silica having a specific surface area of 150 m²/g (commercially available under the trademark HDK® V15 from Wacker Chemie AG, Germany) was incorporated into the mixture. After 20 minutes of homogenization in vacuo, 0.01 g tetra-n-butyl titanate monomer was admixed under vacuum. The resulting composition was then filled into a moisture-proof container for further storage.

Example 1

200 g of a α,ω-dihydroxypolydimethylsiloxane having a viscosity of 80,000 mPa·s, 100 g of a trimethylsilyl-terminated polydimethylsiloxane having a viscosity of 1,000 mPa·s and a homogeneous preblend of 10 g n-propyltriacetoxysilane and 5.8 g methyltriacetoxysilane were mixed for 5 minutes in a planetary mixer. Subsequently, 26 g of fumed silica having a specific surface area of 150 $m^2/g$ (commercially available under the trademark HDK® V15 from Wacker Chemie AG, Germany) was incorporated into the mixture. After 20 minutes of homogenization in vacuo, 0.01 g tetra-n-butyl titanate monomer was admixed under vacuum.

Example 2

200 g of a α,ω-dihydroxypolydimethylsiloxane having a viscosity of 80,000 mPa·s, 100 g of a trimethylsilyl-terminated polydimethylsiloxane having a viscosity of 1,000 mPa·s, and 15.8 g n-propyltriacetoxysilane were mixed for 5 minutes in a planetary mixer. Subsequently, 26 g of fumed silica having a specific surface area of 150 $m^2/g$ (commercially available under the trademark HDK® V15 from Wacker Chemie AG, Germany) was incorporated into the mixture. After 20 minutes of homogenization in vacuo, 0.01 g tetra-n-butyl titanate monomer was admixed under vacuum.

Example 3

520 g of a α,ω-dihydroxypolydimethylsiloxane having a viscosity of 80,000 mPa·s, 190 g of a hydrocarbon mixture having a kinematic viscosity of 6.2 $mm^2/s$ at 40° C., a viscosity-gravity constant (VGC) of 0.79 and a boiling range of from 300 to 370° C., and a homogeneous blend of 22 g of n-propyltriacetoxysilane and 10 g of methyltriacetoxysilane were mixed for 5 minutes in a planetary mixer. Subsequently, 60 g of fumed silica having a specific surface area of 150 $m^2/g$ (commercially available under the trademark HDK® V15 from Wacker Chemie AG, Germany) was incorporated into the mixture. After 20 minutes of homogenization in vacuo, 2.4 g of polyalkylene glycol (molecular weight of 600 g/mol) consisting of 13 ethylene oxide units and 1 propylene oxide unit, and 0.01 g tetra-n-butyl titanate monomer were admixed under vacuum. The resulting composition was then filled into a moisture-proof container for further storage.

In order to determine the rheological and mechanical properties of the materials, the compositions of Comparative Examples 1 to 3 and Examples 1 to 4 were cured for 14 days at a temperature of 23° C. and a relative humidity of 50% at standard atmospheric pressure (1013 mbar) to give elastomers.

The skin formation time has been determined by applying the composition onto a substrate and measuring the period of time until a skin has been formed on the surface of the composition. Skin formation is deemed to be completed if the surface of the composition can be contacted with a laboratory spatula and upon removal of the spatula does not form any strings or remains on the spatula.

The physical properties of the cured elastomers were tested in accordance with standard methods. Shore A hardness was measured according to DIN 53505. Modulus, Tensile strength and Elongation at break were measured according to DIN 53504 S3. Rheological properties were measured according to DIN 54458. Resistance to flow was measured according to DIN EN ISO 7390. Results are shown in Table 1.

It can be seen that the skin formation time of the inventive examples, which is decisive for handling and tooling in the application, are similar to comparative example 1 using conventional tin catalysts while the comparative examples 2 to 4 show an insufficient skin formation time of less than 10 minutes. After accelerated ageing, skin formation time of the inventive examples show a lower increase which confirms better storage stability. The elastomer properties of the inventive formulations show moderately lower 100% strain values ("modulus 100%") than the comparative examples 2 to 4, which is decisive for the sealant classification. The rheologic properties of the inventive examples further show a lower flow point which means a softer consistency. Additionally, the materials are non-sag sealants. This makes the sealant easy to apply. Prior to the present invention, the inherent skin formation time could not be changed without negatively affecting the storage stability of the compound. Using a combination of organotin catalysts with the specific curing agent described above solves this problem.

TABLE 1

| Results | | | | | | | |
|---|---|---|---|---|---|---|---|
| | Comparative Example 1 | Comparative Example 2 | Comparative Example 3 | Comparative Example 4 | Example 1 | Example 2 | Example 3 |
| Skin formation time after production [min] | 18 | 6 | 7 | 7 | 20 | 24 | 31 |
| Skin formation time after 4 weeks at 70° C. [min] | 26 (+44%) | 20 (+230%) | 14 (+100%) | 11 (+57%) | 28 (40%) | 31 (+29%) | 37 (+19%) |
| Shore A hardness | 19 | 25 | 22 | 24 | 20 | 19 | 24 |
| Modulus 100% [N/mm$^2$] | 0.31 | 0.46 | 0.40 | 0.41 | 0.36 | 0.27 | 0.38 |
| Tensile strength [N/mm$^2$] | 1.7 | 1.0 | 1.1 | 1.1 | 1.4 | 1.2 | 1.5 |
| Elongation at break [%] | 560 | 295 | 369 | 340 | 440 | 366 | 470 |
| Viscosity η* (γ = 0.1%) [mPa · s] | 710,000 | 278,000 | 299,840 | 234,200 | 202,850 | 170,520 | 327,000 |
| Flow point (shear stress at tan d = 1) [Pa] | 2,660 | 2,160 | 2,160 | 1,600 | 1,150 | 719 | 671 |

What is claimed is:

1. A one-part room-temperature curable composition, comprising:
   (A) at least one organosilicon compound containing condensable groups;
   (B) at least one curing agent composition, comprising:
      (B)(i) at least one compound having the formula (IV):

R'Si(OOCR")$_3$  (IV)

wherein
      R' each is the same or different and is $C_3$-$C_6$ alkyl, and R" each is the same or different and is $C_1$-$C_6$ alkyl, and optionally,
      (B)(ii) an additional curing agent other than the compound having the formula (IV), said additional compound having the formula (III):

$Z_cSiR^1_{(4-c)}$  (III)

wherein
      $R^1$ each is identical or different and is a monovalent, unsubstituted or substituted hydrocarbon radical, wherein one or more carbon atoms of the hydrocarbon radical are optionally replaced with oxygen atoms,
      Z each is identical or different and is a condensable radical, and
      c is 2, 3 or 4;
   (C) at least one curing catalyst comprising an organotitanium compound
   wherein the organotitanium compound has the formula (V):

Ti(OR''')$_4$  (V)

wherein R''' each is the same or different and is $C_1$-$C_{10}$ alkyl; and
   (D) at least one filler;
   wherein curing agent composition (B) comprises at least 60 wt. % of compounds having the formula (IV), based on the total weight of the curing agent composition-, and wherein the curable composition is free of organotin compounds;
   wherein the curing agent composition (B) further comprises condensates of two or more molecules of the compound having the formula (III), of the compound having the formula (IV)

R'Si(OOCR")$_3$  (IV)

wherein
   R' each is the same or different and is $C_3$-$C_6$ alkyl, and R" each is the same or different and is $C_1$-$C_6$ alkyl,
   or mixtures thereof.

2. The curable composition of claim 1, wherein the curable composition exhibits a skin formation time of from 15 to 30 minutes.

3. The curable composition of claim 1, wherein curing agent composition (B) is present in an amount of 2.5 wt.-% to 6 wt.-% based on the total weight of the curable composition.

4. The curable composition of claim 1, wherein curing agent composition (B) is present in an amount of from 4 to 10 parts by weight, based on 100 parts by weight of component (A).

5. The curable composition of claim 1, wherein component (C) is present in an amount of from 0.001 to 2 parts by weight, based on 100 parts by weight of component (A).

6. The curable composition of claim 1, wherein component (C) is present in an amount of from 0.001 to 0.5 parts by weight, based on 100 parts by weight of component (A).

7. The curable composition of claim 1, wherein the curable composition comprises filler(s) (D) in an amount of greater than 0 and up to 300 parts by weight, based on 100 parts by weight based of organosilicon compound (A).

8. The curable composition of claim 1, wherein the curable composition comprises filler(s) (D) in an amount of from 5 to 150 parts by weight, based on 100 parts by weight of organosilicon compound (A).

9. The curable composition of claim 1, wherein the curable composition contains component (D) in an amount greater than 0 wt.-% and up to 60 wt.-% based on the total weight of the curable composition.

10. The curable composition of claim 1, wherein R' is n-propyl and R" is methyl.

11. The curable composition of claim 1, wherein R" is n-butyl.

12. The curable composition according to claim 1, wherein Z is acetoxy, $R^1$ is methyl and c is 3.

13. The curable composition of claim 1, wherein up to 30% of all Si atoms in the curing agent are contained in the condensates.

14. The curable composition of claim 1, wherein the condensable groups of organosilicon compound (A) are selected from hydroxyl groups, acetoxy groups, or a combination thereof.

15. The curable composition of claim 1, wherein the organosilicon compound (A) comprises units of the formula (I):

$R_aY_bSO_{(4-a-b)/2}$  (I)

wherein
R each is identical or different and is a substituted or unsubstituted hydrocarbon radical, wherein one or more carbon atoms of the hydrocarbon radical are optionally replaced with oxygen atoms,
Y each is identical or different and is a hydroxy radical or acyloxy radical,
a is 0, 1, 2, or 3, and
b is 0, 1, 2, or 3,
with the proviso that the sum of a and b is less than or equal to 3 and at least two Y radicals are present per molecule of the organosilicon compound.

16. The curable composition of claim 1, wherein the organosilicon compound (A) is a polyorganosiloxane of the formula (II):

$Y_{3-f}R_fSiO$—$(SiR_2O)_e$—$SiR_fY_{3-f}$  (II)

wherein
R each is identical or different and is a substituted or unsubstituted hydrocarbon radical, wherein one or more carbon atoms of the hydrocarbon radical are optionally replaced with oxygen atoms,
Y each is identical or different and is a hydroxy radical or acyloxy radical,
e is from 30 to 3000, and
f is 1 or 2.

17. The curable composition of claim 1, further comprising from 0.01 to 30 wt. % of a polyalkylene glycol.

18. The curable composition of claim 1, wherein the composition further comprises one or more components selected from the group consisting of
   (E) plasticizers,
   (F) coupling agents, and
   (G) further additives.

19. A molding produced by cross-linking a composition of claim 1.

20. The curable composition of claim 1, which when exposed to moisture, exhibits a skin formation time of from 10 minutes to 30 minutes.

21. The curable composition of claim 1, wherein the organosilicon compound (A) has a viscosity of from 1000 to 350,000 mPa·s.

22. The curable composition of claim 1 wherein a plasticizer is present, and the plasticizer is selected from the group consisting of hydrocarbon oils having an initial boiling point of in the range of 220° C. to 300° C.

* * * * *